United States Patent [19] [11] 4,281,703
Ahmad [45] Aug. 4, 1981

[54] ENERGY SAVING TIRE WITH LARGE PARTICLE SIZE, HIGH STRUCTURE CARBON BLACK IN TREAD

[75] Inventor: Shamim Ahmad, Canal Fulton, Ohio

[73] Assignee: The B. F. Goodrich Company, Akron, Ohio

[21] Appl. No.: 95,265

[22] Filed: Nov. 19, 1979

[51] Int. Cl.³ .......................... B60C 11/00; B60C 1/00
[52] U.S. Cl. .......................... 152/209 R; 152/330 R; 260/42.32; 260/42.47
[58] Field of Search ........... 152/209 R, 209 A, 209 B, 152/209 NT, 209 WT, 330 R, 357 R, 357 A, 358, 359, 374; 260/5, 42.32, 42.47

[56] References Cited
U.S. PATENT DOCUMENTS 3,060,989 10/1962 Railsback et al. ........... 152/330 R X
3,501,422 3/1970 Nordsiek et al. ............ 152/330 R X
3,746,669 7/1973 Dunnom et al. ............. 152/330 R X
4,154,277 5/1979 Sato et al. .................... 152/330 R X

OTHER PUBLICATIONS

*Rubber Technology and Manufacture*, Chemical Rubber Co., 1971, pp. 174–188.

*Primary Examiner*—John T. Goolkasian
*Assistant Examiner*—Lois E. Boland
*Attorney, Agent, or Firm*—Joe A. Powell

[57] ABSTRACT

A pneumatic radial tire having reduced rolling resistance is provided. The tire has a novel tread composition comprising 100 parts by weight of rubber of which at least 90 parts by weight is cis-polyisoprene. The tread composition also has less than 10 parts by weight of processing oil and from 30 to 60 parts by weight of carbon black wherein said carbon black has a particle size greater than about 35 millimicrons and a dibutyl phthalate absorption value greater than 100.

6 Claims, 1 Drawing Figure

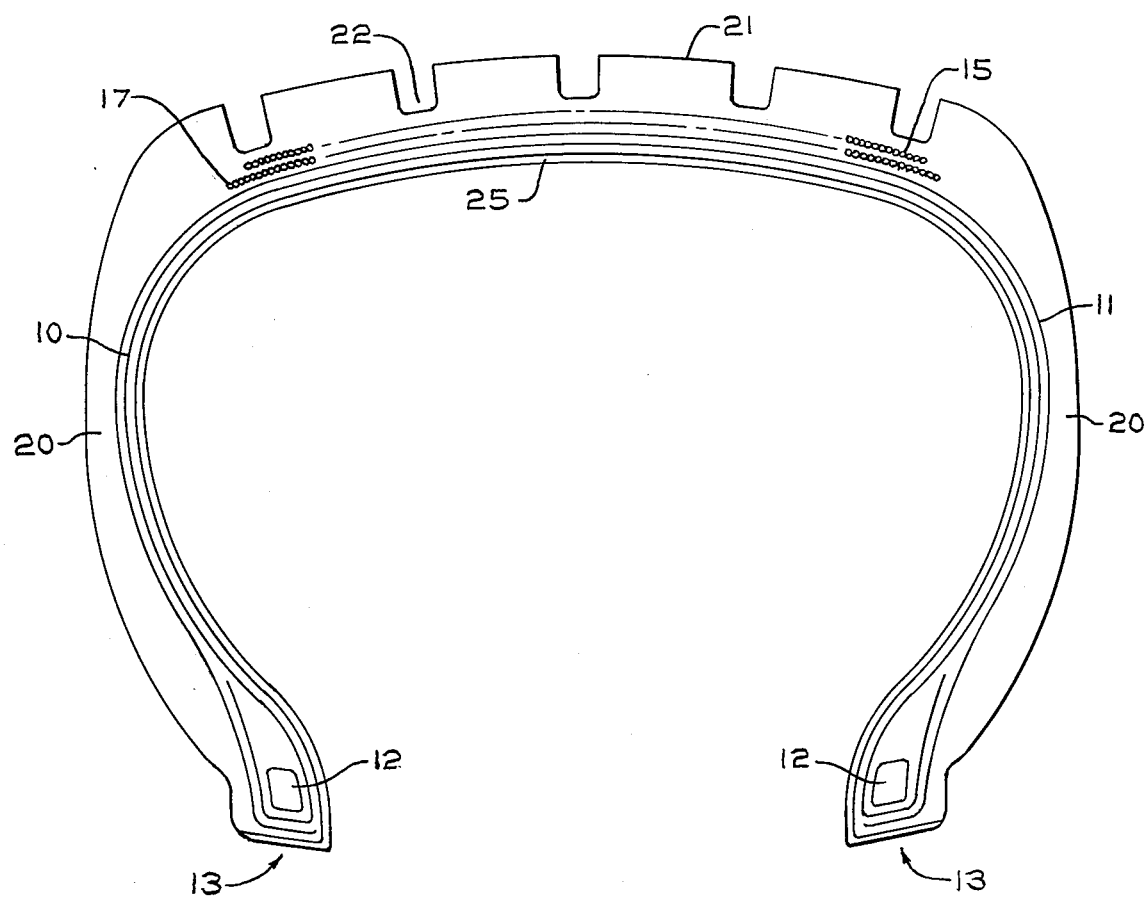

ENERGY SAVING TIRE WITH LARGE PARTICLE SIZE, HIGH STRUCTURE CARBON BLACK IN TREAD

BACKGROUND OF THE INVENTION

With the ever increasing cost and shortage of fuel, means are constantly being sought which will provide greater fuel economy for automobiles. The tires contribute approximately 25 percent of an automobile's total fuel usage. The tires' resistance to rolling and resultant heat buildup is the reason for this contribution.

It is well known that the radial type tire construction results in tires which give lower rolling resistance as compared to bias ply tires. However, there is still a need to improve the rolling resistance of the radial tire. The tire tread has been found to be the major contributor to the rolling resistance of the radial ply tire.

If a tire tread could be invented which would give the tire lower rolling resistance, then there could be a substantial reduction in automobile fuel consumption.

SUMMARY OF THE INVENTION

A tubeless pneumatic radial tire with reduced rolling resistance having a tread compound containing:

(a) 100 parts by weight of rubber hydrocarbon wherein at least 90% of the rubber hydrocarbon is selected from at least one of the group consisting of cis-polyisoprene and cis-polybutadiene;

(b) less than 10 parts by weight of processing oil per 100 parts by weight of rubber; and (c) from about 30 to about 60 parts by weight of carbon black per 100 parts by weight rubber, wherein the carbon black has a particle size greater than about 35 millimicrons and a dibutyl phthalate absorption value greater than 100 cc/100 grams.

BRIEF DESCRIPTION OF THE DRAWING

The drawing is a cross-sectional view of a typical tubeless radial passenger tire incorporating the novel tread composition of this invention.

DETAILED DESCRIPTION

The invention is illustrated in connection with a radial cord, tubeless, passenger car tire.

Pneumatic tires generally comprise a flexible cord carcass or body to resist the pressure of the inflation gas, terminated at each side edge by a bead which engages the rim of a wheel. The cords are embedded in rubber, and are protected from abrasion by tread and sidewall rubber, and are made to hold air by preferably having an integral essentially impervious liner on the interior of the carcass.

In the drawing, two plies of carcass cords 10 and 11, which may be high-tenacity rayon, polyester, or other suitable material, lie with the individual rubberized cords essentially in radial planes. The edges of the plies are suitably wrapped around inextensible bead grommets 12 forming part of molded beads 13 shaped for engagement with a standard rim.

The radial cord plies 10 and 11 in the crown of the tire, which is the region capable of engaging the road, are surrounded by a circumferential belt, which in this instance is shown as consisting of two strips of steel cords but could be of other low-extensible material such as aromatic polyamide fibers also known as aramid fibers. The steel cord belt plies 15 and 17 are preferably prepared with the cords in each ply parallel to each other and at an angle to the circumferential central plane of the tire, the cords in one ply extending in a direction opposite to the cords in the other ply. This angle in the finished tire may be about 15° to 30° relative to the circumferential central plane. The two crown plies form an essentially inextensible belt around the radial cord plies.

On the inner face of the tire is a liner 25 composed of a rubber material having resistance to diffusion of air such as butyl rubber, or halogenated butyl rubber, and/or blends thereof, and extending from one bead 13 to the other bead so as to seal against the rim and minimize the loss of inflation gas or its penetration into the body of the tire.

A protective layer of rubber completely surrounds the tire. This is preferably composed of a moderate thickness of sidewall rubber 20 in the zones where intense flexing occurs, and a thick layer of tread rubber 21 for resisting road wear. Tread rubber 21 is located such that it is in the road contact area of the tire. The tread layer has a suitable nonskid pattern 22 of slits, slots, grooves and the like.

The tire of this invention is conventional with the exception of a novel low rolling resistance tread 21. The tread compound contains 100 parts by weight of rubber hydrocarbon wherein at least 90 parts by weight of rubber hydrocarbon is selected from at least one of the group consisting of cis-polyisoprene and cis-polybutadiene. Cis-polyisoprene includes natural rubber. Cis-polyisoprene and cis-polybutadiene are particularly desirable rubbers to use because of their high resiliency and low heat buildup. The remaining 10 parts by weight of rubber hydrocarbon may be any of the rubbers normally used in tire production such as styrene-butadiene, EPDM, chlorobutyl and the like. Preferably, the rubber hydrocarbon of the tread is 100% cis-polyisoprene and/or cis-polybutadiene.

The second necessary ingredient of the novel tread is processing oil. The processing oil may be aromatic, naphthalenic, and/or paraffinic oil. The tread must contain less than 10 parts by weight of processing oil per 100 parts by weight of rubber hydrocarbon. Preferably, the level of oil used is from 2 to 5 parts per 100 parts by weight of rubber hydrocarbon. Oil levels above 10 parts by weight per 100 parts by weight of rubber would result in excessive heat buildup thereby increasing rolling resistance. The oil is used primarily for processing considerations and therefore it is preferred to use only as much oil as is needed to process the rubber compound through normal rubber processing equipment such as mills, Banbury and extruders.

The third necessary ingredient of the novel tread is carbon black. The tread contains from 30 to about 60 parts by weight of carbon black per 100 parts by weight of rubber. The carbon black suitable for use in this invention must have a particle size greater than about 35 millimicrons and a dibutyl phthalate (DBP) absorption value greater than 100. Preferably, the carbon black has a DBP absorption value greater than 120 and a particle size greater than about 50 millimicrons.

Dibutyl phthalate (DBP) absorption value is measured by the method specified in ASTM D2414. The DBP absorption values are usually reported in cubic centimeters of DBP absorbed per 100 grams of carbon black. The DBP absorption value of a carbon black is a function of its particle size and its structure. The smaller the particle size for a given structure, the higher the DBP absorption value and the higher the structure for a given particle size, the higher the DBP absorption value.

Examples of carbon blacks suitable for use in this invention are those with ASTM designation N550, N765, N785 and the like. N785 has been found to be a particularly desirable carbon black. The relative large particle size and high DBP absorption values of these blacks result in tread compounds that generate minimum heat and therefor are low in rolling resistance.

In addition to the three ingredients described above, the novel tread compound must contain vulcanizing agents in sufficient quantity to properly vulcanize the rubber compound. The amounts and types of vulcanizing agents suitable for use in this invention are well known in the art. A typical vulcanization system would be a combination of sulfur and sulfenamide accelerator.

Many compounding ingredients may be used in the novel tread composition other than rubber, oil, carbon black, and vulcanizing agents. Such ingredients include activators such as zinc, calcium, and magnesium oxide, fatty acids such as stearic and lauric acid, and salts thereof such as cadmium, zinc, and copper stearate and lead oleate. Antioxidants, antiozonates, waxes, and stabilizers may be used in the novel compositions.

The compounding ingredients are added to the rubber using internal mixers such as Banbury mixers, two-roll mills and the like. The sulfur and accelerators are added to the rubber mix near the end of the mixing cycle to minimize premature vulcanization.

Tires may be produced with the tread of this invention by employing conventional radial tire fabrication procedures, which are well known in the art. Once the tire is built, it is vulcanized in a press using standard tire curing procedures and conditions which are also well known in the art.

EXAMPLE

An HR 78-15 size radial passenger tire having the novel tread described above was tested for rolling resistance and the results compared with a like tire having a conventional tread. The novel tread compound used was as is shown in Table I.

TABLE I

| Ingredients | Parts by Weight |
|---|---|
| Cis-polyisoprene rubber | 70.00 |
| Cis-polybutadiene rubber | 30.00 |
| Zinc Oxide | 5.00 |
| N785 Carbon Black | 42.00 |
| Oil | 4.00 |
| Stearic Acid | 2.50 |
| Peptizer | 0.25 |
| Age Resistors (Antioxidants + Antiozonants + Wax) | 5.25 |
| Vulcanizing Agents | 4.05 |

The tires were tested for rolling resistance using a 67.23 inch diameter roadwheel. The tire with the novel tread and the control tire were both mounted on 15×6 rims and inflated to 28 psig. The tires were tested at a speed of 50 mph using the load and inflation schedule shown in Table II.

TABLE II

| Test Point | Inflation | Load* | Duration |
|---|---|---|---|
| 1 | 28 psig | 100% | 30 min |
| 2 | 28 psig | 80% | 10 min |
| 3 | 28 psig | 60% | 10 min |
| 4 | 36 psig | 80% | 10 min |

TABLE II-continued

| Test Point | Inflation | Load* | Duration |
|---|---|---|---|
| 5 | 20 psig | 80% | 10 min |

*The load is expressed as a percentage of Tire and Rim Association rated load at 24 psig.

At the end of each duration, the loaded torque was measured and then the tire was unloaded from the roadwheel and the unloaded torque was measured. The loaded torque minus the unloaded torque represents the rolling resistance of the tire. The results are reported in Table III in units of horsepower.

TABLE III

|  | 1 | 2 | 3 | 4 | 5 |
|---|---|---|---|---|---|
| Control Tires | 2.75 | 2.17 | 1.62 | 1.99 | 2.68 |
| Low Rolling Resistance Tire | 2.12 | 1.63 | 1.19 | 1.40 | 2.01 |
| % Improvement of Tire With Novel Tread as Compared to Control Tire | 23% | 25% | 27% | 30% | 25% |

As can be seen from the data in Table III, the novel low rolling resistance tread unexpectedly reduces the tire's rolling resistance by 23-30%. This translates to a fuel savings of 6 to 7% for the automobile.

Tires employing this invention are particularly useful on passenger cars.

Although this invention has been illustrated, by way of example, using N785 carbon black. Other carbon blacks may be substituted for N785 or blends of more than one carbon black may be used. The important criterion is that the carbon black used must have a dibutyl phthalate absorption value greater than 100 and a particle size greater than about 35 millimicrons.

Cis-polyisoprene, the synthetic duplicate of natural rubber, may be substituted or blended with natural rubber in this invention. As is well known by those skilled in the art, it is sometimes desirable to blend rubbers together to achieve better processing characteristics depending on the particular type of equipment and conditions used.

In practicing this invention, those skilled in the art may make minor variations in the disclosed novel tread composition in order to facilitate processing on their particular equipment. Therefore, it is intended that the scope of this invention be limited only by the following claims.

I claim:

1. In a tubeless pneumatic radial tire comprising two spaced inextensible beads, a ground contacting tread portion, a pair of individual sidewalls extending radially inward from the axial outer edges of said tread portion to join the respective beads, a carcass portion having at least one ply of rubberized cords lying essentially in radial planes wherein said cords are wrapped around said blades, an integral air impervious innerliner disposed inwardly of said carcass portion, a circumferential belt comprising at least two plies of low extensible cords with the cords in each ply parallel to each other and at an angle to the circumferential central plane of the tire and with the cords in one ply extending in a direction opposite to the cords in the other ply, the improvement consisting in the tread being formed of a composition comprising:
    (a) 100 parts by weight of rubber hydrocarbon wherein at least 90 parts of the rubber hydrocarbon is selected from at least one of the group consisting of cis-polyisoprene and cis-polybutadiene,
(b) less than 10 parts by weight of processing oil per 100 parts by weight of rubber,
(c) from about 30 to about 60 parts by weight of carbon black per 100 parts by weight of rubber, wherein the carbon black has a particle size greater than about 50 millimicrons and a dibutyl phthalate absorption value greater than 120, and
(d) sufficient curing agents to effect vulcanization.

2. A tire of claim 1 wherein all of the rubber hydrocarbon of said tread is selected from at least one of the group consisting of cis-polyisoprene and cis-polybutadiene.

3. A tire of claim 2 wherein the level of oil used is from 2 to 5 parts by weight per 100 parts by weight of rubber hydrocarbon.

4. A tire tread composition comprising:
(a) 100 parts by weight of rubber hydrocarbon wherein at least 90 parts by weight of the rubber hydrocarbon is selected from at least one of the group consisting of cis-polyisoprene and cis-polybutadiene,
(b) less than 10 parts by weight of processing oil per 100 parts by weight of rubber,
(c) from about 30 to about 60 parts by weight of carbon black per 100 parts by weight of rubber, wherein the carbon black has a particle size greater than about 50 millimicrons and a dibutyl phthalate absorption value greater than 120, and
(d) sufficient curing agents to effect vulcanization.

5. A tread composition of claim 4 wherein all of the rubber hydrocarbon is selected from at least one of the group consisting of cis-polyisoprene and cis-polybutadiene.

6. A tread composition of claim 4 wherein the level of oil used is from 2 to 5 parts by weight per 100 parts by weight of rubber hydrocarbon.

* * * * *